United States Patent [19]

Harvey

[11] 3,948,710
[45] Apr. 6, 1976

[54] METHOD OF CONTOURING A PLANAR LAMINATE STRUCTURE

[76] Inventor: William B. Harvey, 8932 Footed Ridge, Columbia, Md. 21045

[22] Filed: Sept. 12, 1974

[21] Appl. No.: 505,213

Related U.S. Application Data

[63] Continuation-in-part of Ser. No. 462,397, April 19, 1974.

[52] U.S. Cl. ............ 156/211; 156/268; 264/DIG. 4; 264/162; 264/321
[51] Int. Cl.² .......................................... B31F 3/00
[58] Field of Search .................... 156/211, 153–154, 156/196, 226–227, 247–250, 254–255, 257, 268, 344, 6; 229/3.1, 3.5; 161/117; 93/58 ST, 1 S; 264/139, 257–258

[56] References Cited
UNITED STATES PATENTS

| | | |
|---|---|---|
| 3,058,868 | 10/1962 | Schroeder .................... 156/254 UX |
| 3,180,486 | 4/1965 | Kahler et al. ..................... 229/3.5 X |
| 3,555,976 | 1/1971 | Carter et al. .................. 93/58 ST X |
| 3,557,277 | 1/1971 | Brodersen et al. .................. 264/316 |

*Primary Examiner*—William A. Powell
*Assistant Examiner*—David A. Simmons
*Attorney, Agent, or Firm*—Morton J. Rosenberg

[57] ABSTRACT

A method of contouring a planar structure composed of a plastic layer sandwiched between opposing paper layers. A predetermined thickness of one of the paper layers is removed leaving a nappy contour layer surface. The nappy surface is then moistened. The moistened laminated structure is then bent to a predetermined radius of curvature and mounted in a fixture to hold the structure until it dries. Upon drying, the structure is removed from the fixture and maintains the predetermined radius of curvature.

25 Claims, 8 Drawing Figures

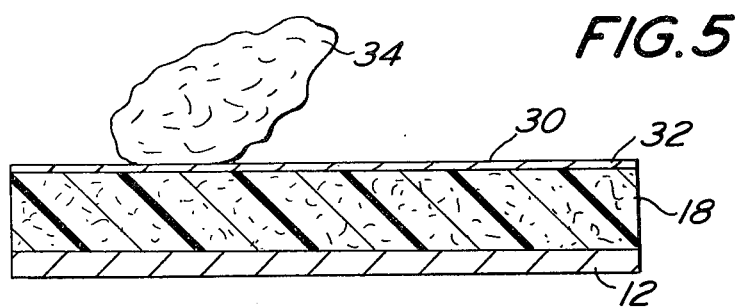
FIG. 5
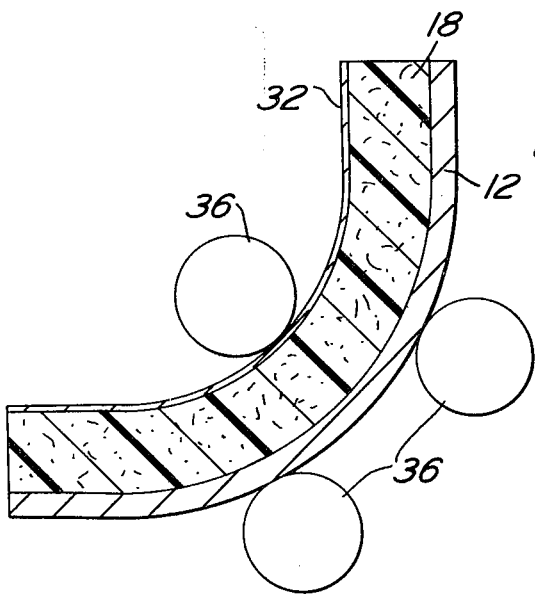
FIG. 6
FIG. 7
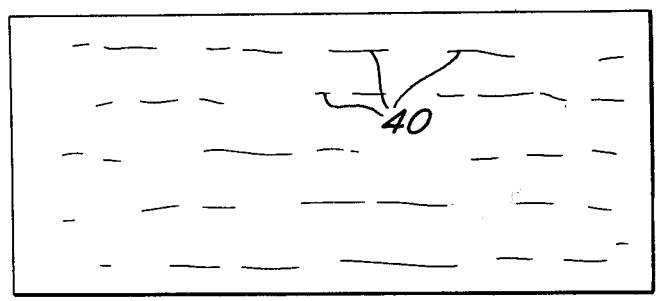
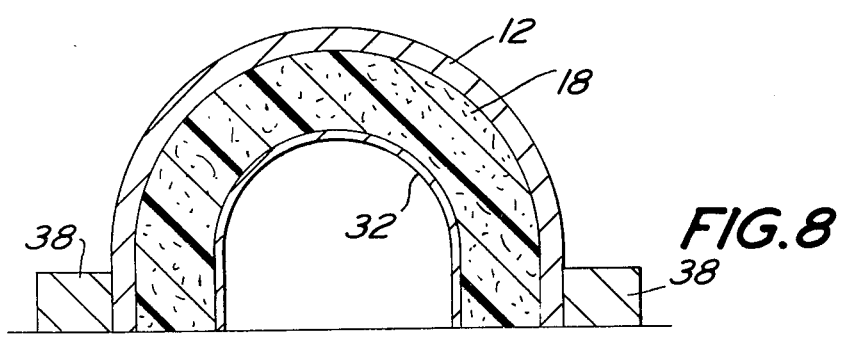
FIG. 8

METHOD OF CONTOURING A PLANAR LAMINATE STRUCTURE

CROSS-REFERENCES TO RELATED REFERENCES

This application is a continuation-in-part to U.S. patent application Ser. No. 462,397, filed Apr. 19, 1974.

BACKGROUND OF THE INVENTION

1. FIELD OF THE INVENTION

This invention pertains to the field of working or contouring planar structures. Further, this invention relates to a method of contouring board structures composed of a porous plastic layer sandwiched between opposing paper surfaces. Additionally, this invention pertains to methods of preparing plastic laminate structures for contouring to predetermined radii of curvature.

2. PRIOR ART

Structural boards having a foamed plastic layer sandwiched between paper layers are well known in the art. However, such prior structural boards are formed in planar elements and cannot be contoured. When such boards are bent they generally are found to break. Further, even when a small bend is made in such board elements, it has generally been found that when pressure is released from the board it has a tendency of reforming itself into a planar member. Thus such board members cannot be used in the manufacture of a wide variety of articles which require light weight combined with structural integrity but also necessitate contours having differing radii of curvature.

In my copending application Ser. No. 462,397, filed Apr. 19, 1974, I have taught the method of producing airplane wings from a planar laminate structure of the type herein described. By perturbing the method as therein described I have now discovered a general method of working the laminate material to produce a structure useful in building a wide variety of objects such as lampshades, canoes, etc.

SUMMARY OF THE INVENTION

A method of contouring a planar laminate structure composed of a porous plastic layer secured to opposingly mounted paper layers. The method includes the step of removing a predetermined thickness of one of the paper layers to form a contour layer surface. The contour layer surface is then moistened and the laminate structure is bent to a predetermined radius of curvature. The laminate structure is dried to provide a rigid laminate structure having the predetermined radius of curvature.

BRIEF DESCRIPTION OF THE DRAWINGS

FIG. 5 is an elevation view of the planar structure having moisture applied to an upper surface;

FIG. 6 is an elevation view of the planar structure being contoured;

FIG. 7 is a plane view of the structure showing a wrinkle pattern; and,

FIG. 8 is an elevation view of the structure being constrained in a fixture.

DESCRIPTION OF THE PREFERRED EMBODIMENTS

Figure 1:
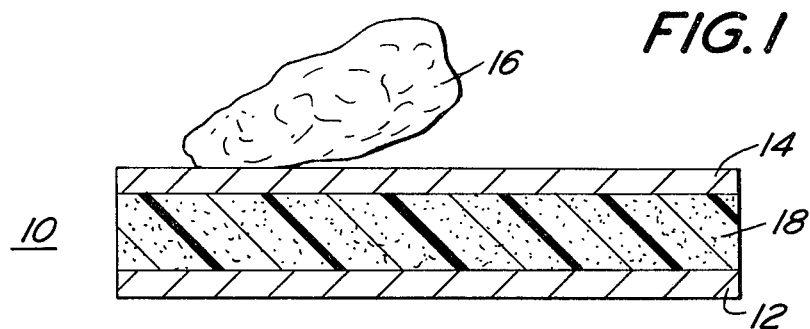
FIG. 1 is an elevation view of the planar structure showing a plastic layer sandwiched between opposing paper layers.

Referring now to FIGS. 1 to 8, there are shown the method steps of working or contouring a planar laminate structure 10 composed of a porous plastic layer 18 secured to opposingly mounted planar fibrous layers 12 and 14. The result of the contouring process is to provide a rigid laminate structure of the type herein detailed which has a predetermined radius of curvature. One type of board material or planar laminate structure 10 utilized in this process is a sandwiched laminate of polystyrene foam 18 secured between high quality paper board liner facings 12 and 14 commonly referred to as FOME-COR, produced and manufactured by Monsanto Corporation, St. Louis, Mo.

In general, polystyrene board or planar laminate structure 10 has been previously used for mountings, display cards, charts, and other graphic specialities where planar or flat surfaces may be accomodated. The inherent brittleness of board 10 has previously caused cracking and destruction of structure 10 when being bent. Overall, the present invention method is directed to the concept of providing varying geometric contours for planar laminate type board material 10 in order to allow the material to rigidly assume different radii of curvature in order that the use of such material be expanded into a wide variety of commercial outlets. Through application of the method of working laminate structure 10 as herein presented, the uses of such material is expanded into the area of building airplane wings, airplane fuselages, canoes, lamp shades, and other such items requiring structure 10 to be contoured to a wide variety of curved geometric shapes, and to fixedly maintain the shape to which the board is contoured.

One type FOME-COR structure 10 used successfully, has overall dimension thicknesses in the range of 3/16 inch. Kraft paper layers 12 and 14 have thicknesses in the order of 1/10,000 inch. However, the exact dimensions in the thickness of laminate structure 10 although being important, does not in general, effect the overall method steps in contouring the planar board.

Initially, board member or planar structure 10 is placed on a planar, flat surface such as a working table or some like member such that lower paper layer 12 interfaces contiguously with the flat table surface throughout its lower extended area. Placement of structure 10 on table element surface may be through removable clamps or some like device not important to the inventive concept as herein described.

Upper paper layer 14 is moistened throughout its surface area with heated water in the range between 120°–212° F. The moistening of upper paper surface 14 can be accomplished through use of sponge 16 which has absorbed the heated water and is manually compressed to release the water onto an upper surface area of layer 14. In this manner, sponge 16 is passed throughout the upper surface of layer 14. A liberal amount of the water is forced unto layer 14 and allowed to remain for about 10 minutes. The upper paper surface 14 after being sponged shows a high reflection of light and exhibits a shine. It is believed that the water during the 10 minute waiting period is to some extent absorbed internal to paper layer 14, at which point the paper is prepared sufficiently to be removed from foamed plastic or polystyrene layer 18.

Another method of initially preparing upper paper surface 14 for partial removal from polystyrene layer 18 is through the impingement of steam on upper paper surface 14. High pressure steam is played on upper paper surface 14 for approximately 10 seconds and it has been found to provide sufficient moisturing effect to permit the partial removal of a portion of upper paper layer 14 from foamed plastic layer 18. Thus, in both of these methods the step of removing a portion of layer 14 or a predetermined thickness thereof, includes the step of initially moistening paper layer 14 throughout an upper surface.

Still another method of removing a partial amount or predetermined thickness of upper paper layer 14 is through a dry process. Once case of dry removal has been through milling, utilizing a rotary milling head that included a stack of mills. By passing the milling heads in direct contact with an upper surface of layer 14, a partial amount of the thickness of paper surface 14 was found to be removable. In another procedure for dry removal of upper paper surface 14, it was passed through a 40 inch sanding machine where a portion of the paper surface was removed. However, some problems with conventional milling and sanding machines were found in that the material was found to be somewhat pliable and did not pass through them easily and thus required more time by an operator in providing a workable board member 10. However, the dry removal steps do provide a method where the step of removing a predetermined thickness of layer 14 allows for abrasive removal of layer 14.

Figure 2:
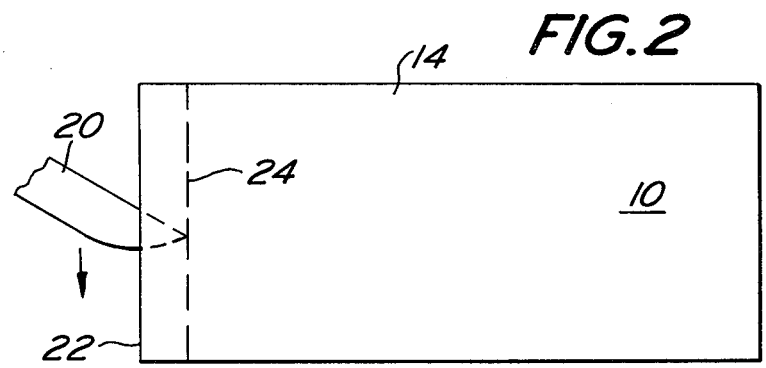
FIG. 2 is a plane view of the planar structure.
Figure 3:
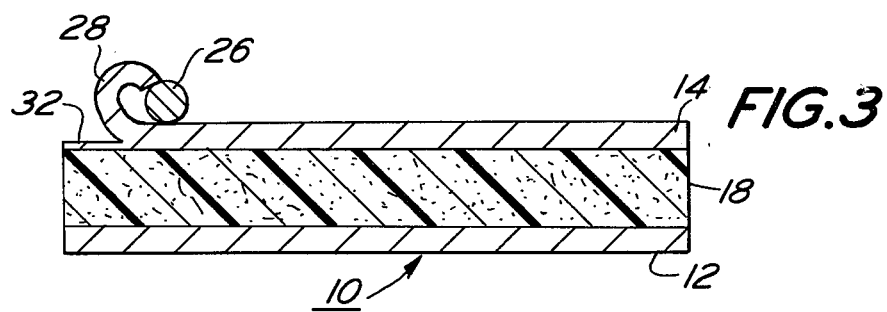
FIG. 3 is an elevation view of the planar structure showing removal of a portion of one paper layer.

After the preferred method step of moistening upper paper layer 14, knife member 20 is inserted within upper paper surface 14 to a predetermined thickness, as is shown in FIGS. 2 and 3. Approximately 50–80% of the thickness of upper paper layer 14 has been found to be an advantageous amount to be removed. In practice, a preferred amount of 70.0% of layer 14 is removed. Knife 20 is inserted approximately ½ inch into layer 14 and parallel slit 24 is made throughout the width of planar structure 10. It is important that the full depth of upper paper layer 14 not be removed from layer 18 in order that a nap of fibrous material be left on top of the polystyrene layer 18. Thus, layer 14 is slitted along one edge thereof to a depth of the predetermined thickness to be removed and forms first section 28.

Figure 4:
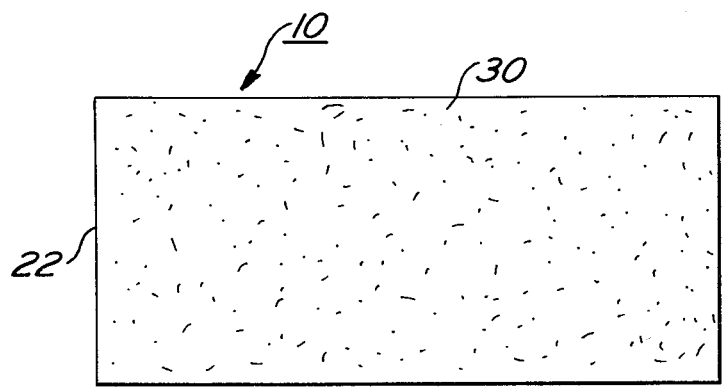
FIG. 4 is a plane view of the planar structure showing a nappy surface.

After knife 20 and parallel slit 24 have been made in layer 14 as is shown, roll bar 26 is placed on top of upper paper surface 14. First section 28 of upper paper surface 14 is then mounted to or rolled around cylindrical bar 26. Bar 26 is then displaced throughout the length of board member 10 while first section 28 is rolled around it. Where proper moistening of upper paper surface 14 has not been accomplished, there is a tendency to tear upper paper surface 14 leaving a possible gap as bar 26 is rolled throughout the length of board member 10. As is shown in FIG. 4, after completion of rolling bar 26, contour layer surface 30 is left which has a nappy consistency having fibrous material extending from the upper area surface. Thus, a predetermined thickness of layer 14 is torn away to expose nappy upper surface 30.

It has been found important to the inventive concept that a portion of the depth of upper paper surface 14 be maintained on polystyrene layer 18. From experiments made it has been found that where all of upper paper surface 14 is removed, board member 10 does become more pliable and easier to bend or contour but in addition it has been found that the remaining structure loses strength. Thus, in some cases, where layer 14 has been totally removed and the remaining structure 10 is contoured or bent into varying radii of curvature, it has been found that polystyrene layer 18 oftentimes cannot take even minimum load considerations and has snapped. Thus, it has been determined that the removal of only some of upper paper layer 14 is necessary in order that the remaining paper layer provide strength for board member 10 but is yet in a condition where the remaining structure of board member 10 may still be contoured or bent.

After bar 26 has removed the specified portion of upper layer 14, nappy fibrous material layer 32 having contour layer surface 30 is moistened. Water may be applied to surface 30 by sponge 34 in order that some of the water soaks into layer 32. After sponge element 34 is passed over layer 32, board member 10 is passed through three bar roller mechanism 36 or some like device to provide for a predetermined radius of curvature. The board member 10 is then placed in fixture 38 to permit drying of board member 10 in the predetermined contour. Once dried, board member 10 has been found to remain in the predetermined position. What has been observed as is shown in FIG. 7, is that after insertion within three bar roller 36 or some other mechanism to bend or contour board member 10, a uniform wrinkle pattern is formed showing a pattern of wrinkles 40 where substantially none of wrinkles 40 on nappy layer 32 were found to be longer than 2 inches.

It has been found that polystyrene layer 18 generally has a grain which passes in the direction of the lines of extrusion. It has been found preferable to bend member 10 in the direction of the grain of polystyrene layer 18. Where a contour is made against the lines of extrusion of grain, it has been found that the radius of curvature or bend is not as good as when the contour is made in the direction of the grain since there has been found to be break lines on lower paper surface 12 after the bending process has been completed. Additionally, deformations have been visually observed in polystyrene layer 18 when contours are made against the grain of the material.

It is believed, that the original manufacture of planar laminate structure 10 is formed in a dynamic process where the polystyrene foam is expanded and simultaneously extruded from a mechanism at which point extruded layer 18 picks up paper surfaces 12 and 14 on either side of polystyrene foam layer 18. It is further believed that the method of attaching polystyrene layer 18 to surfaces 12 and 14 is two-fold: (1) in that after passage through the extruding mechanism, layer 18 is not totally firm and is in a sticky form, thus has some adhesive effect on the paper being applied; and (2) there is additionally adhered an application of a water base contact cement or water base cement applied to the paper to provide for the final laminate structure.

It is believed that the application of the water on nappy surface 30 in some degree dissolves the cement between surface 32 and polystyrene layer 18. This allows the material to be contoured or bent and then upon the water evaportion, it is believed that the water base cement once again takes hold and that there is essentially a curing stage which permits the holding of the curve or contour after board 10 has been placed in fixture 38 and has dried.

While the invention has been described with certain specific embodiments thereof, it will now be understood that further modifications will suggest themselves to those skilled in the art, and it is intended to cover such modifications within the scope of the appended claims.

What is claimed is:

1. A method of contouring a planar laminate structure composed of a porous plastic layer secured to opposingly mounted planar paper layers including the steps of:
   a. removing a predetermined thickness of one of said paper layers to form a contour layer surface;
   b. moistening said contour layer surface;
   c. bending said planar laminated structure to a predetermined radius of curvature, said contour layer surface forming at least a portion of a concave surface of said laminated structure; and,
   d. drying said laminated structure to provide a rigid laminate structure having said predetermined radius of curvature.

2. The method of contouring a planar laminate structure as recited in claim 1 where the step of removing said predetermined thickness of one of said paper layers includes the step of initially moistening said paper layer throughout an upper surface thereof.

3. The method of contouring a planar laminate structure as recited in claim 2 where the step of initially moistening said paper layer includes the step of applying heated water to said upper surface.

4. The method of contouring a planar laminate structure as recited in claim 3 where the step of applying heated water includes the step of sponging said upper surface with water having a predetermined temperature within the approximating range of 120°–212° F.

5. The method of contouring a planar laminate structure as recited in claim 2 where the step of initially moistening said paper layer includes the step of directing a jet of steam on said upper surface of said paper layer.

6. The method of contouring a planar laminate structure as recited in claim 1 where the step of removing said predetermined thickness of one of said paper layers includes the step of abrasively removing said predetermined thickness of said paper layer.

7. The method of contouring a planar laminate structure as recited in claim 6 where the step of abrasively removing said predetermined thickness of said paper layer includes the step of milling an upper surface of said paper layer.

8. The method of contouring a planar laminate structure as recited in claim 6 where the step of abrasively removing said predetermined thickness of said paper layer includes the step of sanding an upper surface of said paper layer.

9. The method of contouring a planar laminate structure as recited in claim 1 where the step of removing said predetermined thickness of said paper layer includes the step of tearing said predetermined layer thickness from said layer to expose said contour layer surface.

10. The method of contouring a planar laminate structure as recited in claim 9 where said contour layer surface is composed of fibrous material.

11. The method of contouring a planar laminate structure as recited in claim 9 where said contour layer surface is composed of a nappy surface roughness.

12. The method of contouring a planar laminate structure as recited in claim 9 where the step of tearing is preceded by the step of slitting said paper layer along one edge thereof to a depth of said predetermined thickness to be removed to form a first section of said paper layer.

13. The method of contouring a planar laminate structure as recited in claim 12 where the step of slitting said paper layer is followed by the step of wrapping said first section around a roll bar.

14. The method of contouring a planar laminate structure as recited in claim 13 where the step of wrapping is followed by the step of rolling said roll bar throughout an extension of said planar laminate structure thereby removing said predetermined layer thickness from said layer.

15. The method of contouring a planar laminate structure as recited in claim 1 where said predetermined thickness to be removed is within the approximate range of between 50.0–80.0% of said thickness of said layer.

16. The method of contouring a planar laminate structure as recited in claim 15 where said predetermined thickness to be removed approximates 70.0% of said thickness of said layer.

17. The method of contouring a planar laminate structure as recited in claim 1 where the step of moistening said contour layer surface includes the step of applying water to said contour layer surface.

18. The method of contouring a planar laminate structure as recited in claim 17 where the step of applying water includes the step of sponging said contour layer surface with water.

19. The method of contouring a planar laminate structure as recited in claim 1 where the step of bending includes the step of passing said laminate structure through a three bar roller to contour said structure to said predetermined radius of curvature.

20. The method of contouring a planar laminate structure as recited in claim 19 where the step of bending is followed by the step of mounting said curved laminate structure in a fixture to rigidly hold said curved laminate structure in rigid support.

21. The method of contouring a planar laminate structure as recited in claim 1 where said porous plastic layer is formed of foamed polystyrene.

22. The method of contouring a planar laminate structure as recited in claim 21 where said paper layers are kraft paper.

23. The method of contouring a planar laminate structure as recited in claim 22 where said paper layers are adhesively secured to said polystyrene layer by a water base cement.

24. The method of contouring a planar laminate structure as recited in claim 23 where each of said paper layers approximate a thickness of 0.0010 inches.

25. The method of contouring a planar laminate structure as recited in claim 24 where said polystyrene layer approximates a thickness within the approximating range of 0.123–0.248 inches.

* * * * *